United States Patent [19]

Shioya et al.

[11] Patent Number: 4,876,645

[45] Date of Patent: Oct. 24, 1989

[54] DIAGNOSTIC SYSTEM

[75] Inventors: Katsuhiko Shioya, Tokyo; Tetsuhiko Ifuku, Machida; Seiichi Inamasu, Kumamoto, all of Japan

[73] Assignee: Fujitsu Limited, Kawasaki, Japan

[21] Appl. No.: 27,117

[22] Filed: Mar. 16, 1987

Related U.S. Application Data

[63] Continuation of Ser. No. 815,197, Dec. 27, 1985, abandoned, which is a continuation of Ser. No. 467,772, Feb. 18, 1983, abandoned.

[30] Foreign Application Priority Data

Feb. 24, 1982 [JP] Japan .................................. 51-28641

[51] Int. Cl.[4] ................................................ G06F 11/22

[52] U.S. Cl. ........................................ 364/200; 371/18

[58] Field of Search ........................ 371/10, 25, 15, 16, 371/89; 364/200, 900

[56] References Cited

U.S. PATENT DOCUMENTS

| | | | |
|---|---|---|---|
| 3,422,402 | 1/1969 | Sakalay | 371/10 X |
| 3,434,116 | 3/1969 | Anacker | 371/10 X |
| 3,748,653 | 7/1973 | Debruyne et al. | 371/10 X |
| 4,183,461 | 1/1980 | Sato | 364/200 |
| 4,412,283 | 10/1983 | Mor et al. | 364/200 |

FOREIGN PATENT DOCUMENTS 0012017 6/1980 European Pat. Off. .

OTHER PUBLICATIONS

Boland, L. J., "Buffer Store Replacement Control", IBM Technical Disclosure Bulletin, vol. 11, No. 12, May 1969, pp. 1738–1739.

Balasubramanian, P. S. et al., "Testing LSI Memory Arrays Using On–Chip I/O Shift Register Latches", IBM Technical Disclosure Bulletin, vol. 17, No. 7, pp. 2019–2020.

Leininger, J. C., "On–Chip Testing Enhancement of a Single–Chip Microprocessor", IBM Technical Disclosure Bulletin, vol. 21, No. 1, pp. 5–6.

*Primary Examiner*—David L. Clark
*Attorney, Agent, or Firm*—Staas & Halsey

[57] ABSTRACT

In a logic unit provided with a plurality of internal registers, an internal memory and a combinational circuit, such as an arithmetic unit, at least one of the plurality of internal registers is arranged to be scanned in and out. During diagnosis, when executing an instruction which makes reference to the internal memory, the register that can be scanned in and scanned out is used in place of the internal memory for diagnosing the combinational circuit.

3 Claims, 5 Drawing Sheets

DIAGNOSTIC SYSTEM

This is a continuation of co-pending application Ser. No. 815,197, filed on Dec. 27, 1985 which is a continuation of Ser. No. 467,772, filed on Feb. 18, 1983, both now abandoned.

BACKGROUND OF THE INVENTION

The present invention relates to a diagnostic system for a data processor constructed so that during its normal operation the output of a memory is input directly to a combinational circuit, such as an arithmetic unit or the like, and the output of the combinational circuit is input directly to the memory. More particularly, the invention pertains to a diagnostic system which diagnoses a circuit referring to a memory via an internal register.

FIG. 1 is a block diagram showing the principles of a conventional logic unit. Reference, numerals 1-A to 1-C indicate gates; 2 designates a memory; 3 identifies a register; SDi denotes scan-in data; SDo represents scan-out data; X shows input data to the gate 1-A; and Y refers to output data from the gate 1-C. Incidentally, the gates 1-A to 1-C are not mere gates but are combinational circuits, such as arithmetic circuits or the like. The combinational circuit is diagnosed by checking its input and output data.

The output data from the gate 1-A is input directly to the memory 2 and the input data to the gate 1-B is data read out directly from the memory 2. In general, however, a scan function for the memory 2 is not provided; therefore, in the arrangement of FIG. !, the gates 1-A and 1-B cannot be diagnosed individually.

FIG. 2 is a block diagram showing the principles of another conventional logic unit which is provided with a write data register 4 and a read data register 5 in addition to the arrangement of FIG. 1. In the case of diagnosing the gate 1-A, the input data X is provided thereto and its output is set in the write data register 4, after which data of the write data register 4 is read out therefrom by a serial scan operation. In the case of diagnosing the gate 1-B, data is written by a serial scan operation into the read data register 5 and its output data is input to the gate 1-B, the output data of which is set in the register 3. Then the data of the register 3 is read out therefrom by the serial scan operation. In this way, the gates 1-A and 1-B can be diagnosed. The write data register 4 and the read data register 5 are used during the diagnosis only and, during normal operation, for speeding up the operation of the logic unit, they are by-passed so that the output data of the gate 1-A is input directly to the memory 2 and the read data of the memory 2 is input directly to the gate 1-B.

Since the provision of the registers which are used solely for diagnosis increases the amount of hardware used, it has been proposed to employ existing registers as the aforesaid read and write data registers 4 and 5.

Incidentally, in the case where a desired test pattern is set in an instruction register, the diagnostic ratio is lowered unless an operation according to the test pattern is not performed normally. In the absence of a scan function for a memory, even if an instruction for reference to the memory, for instance, an instruction for adding data of first and second memories and for storing the added data in the first memory, indicated by (MEM 1)←(MEM 1)+(MEM 2), is provided to an instruction register, the diagnostic results cannot be taken out to the exterior. Therefore, when an instruction of the memory reference format is given, no diagnosis is possible. Accordingly, a high proportion of the memory reference instructions present a serious obstacle to diagnosis

SUMMARY OF THE INVENTION

It is an object of the present invention to provide a diagnostic system which permits a diagnosis of a combinational circuit through using an internal register when a memory reference instruction is given during diagnosis.

Briefly stated, the diagnostic system of the present invention is provided with a plurality of internal registers, an internal memory and a combinational circuit, such as an arithmethic unit, and at least one of the internal registers is arranged so that it can be scanned in and scanned out. In the case of referring to the internal memory during diagnosis, the internal register that can be scanned in and scanned out is used in place of the internal memory.

DESCRIPTION OF THE PREFERRED EMBODIMENTS

Figure 2:
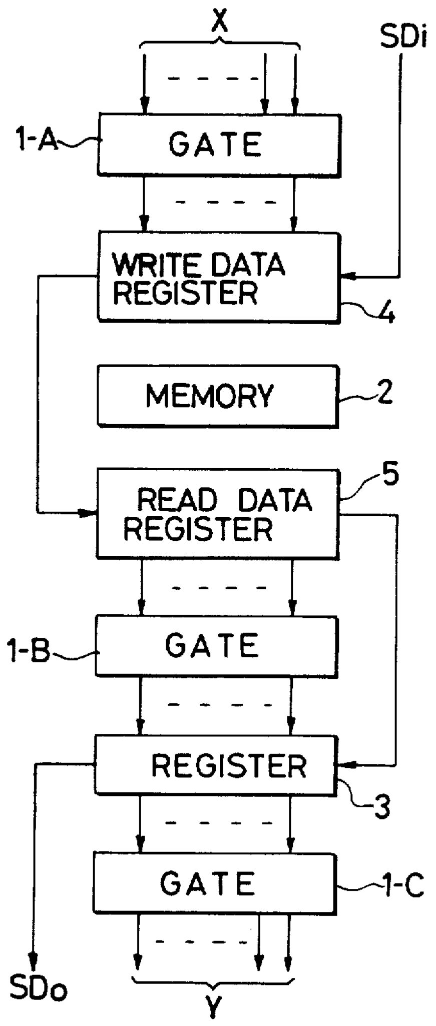
FIG. 2 PRIOR ART
Figure 3:
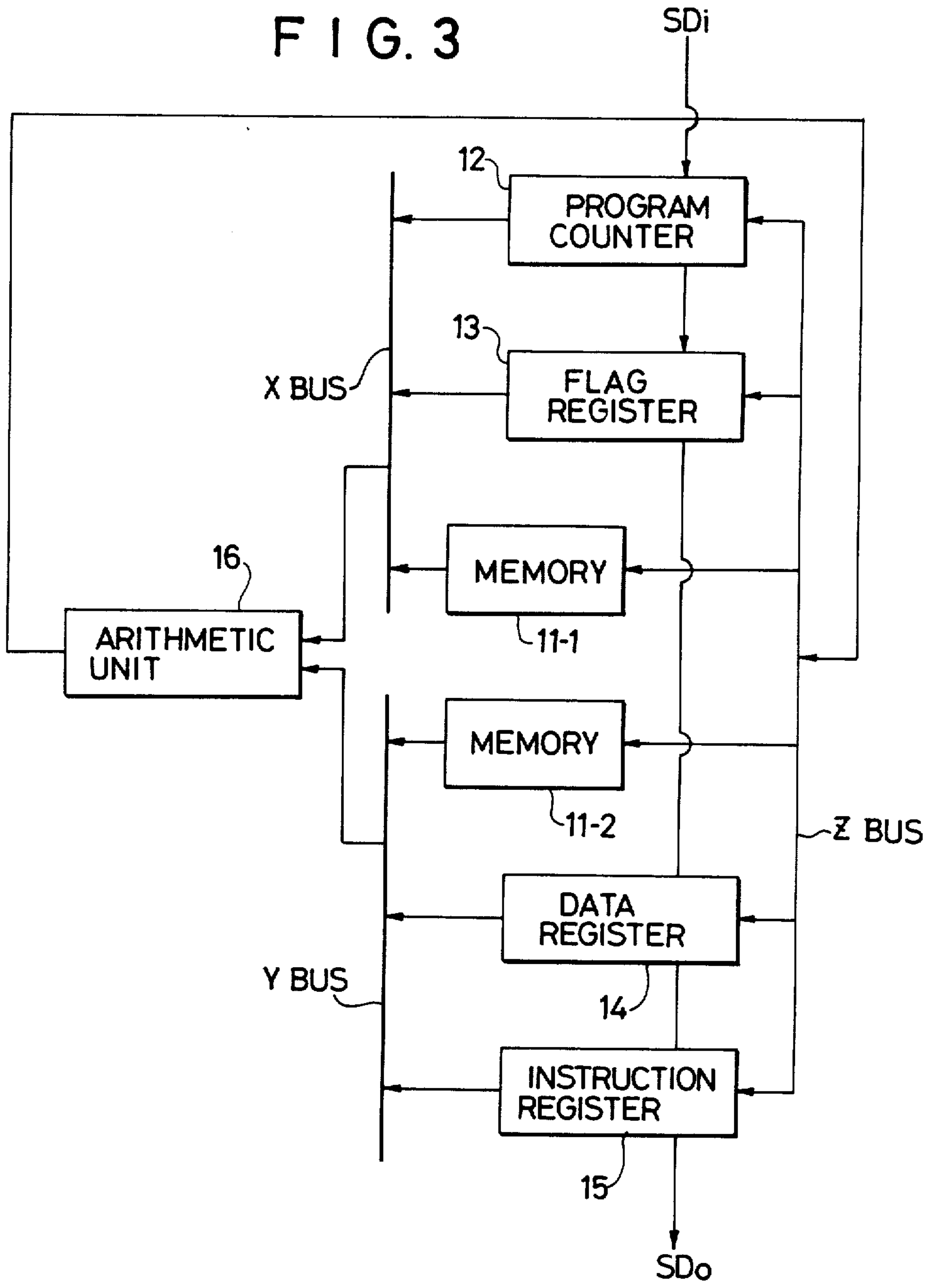
FIG. 3 is a block diagram illustrating an embodiment of the present invention.

FIG. 3 illustrates in block form an embodiment of the present invention. Reference numerals 11-1 and 11-2 indicate internal memories; 12 designates a program counter; 13 identifies a flag register; 14 denotes a data register; 15 represents an instruction register; 16 shows an arithmetic unit; SDi refers to scan-in data; and SDo signifies scan-out data. Incidentally, the arithmetic unit 16 corresponds to the gate 1-A or 1-B in FIGS. 1 and 2. The registers 12, 13, 14 and 15 which are internal registers are interconnected by a scan chain. In this case, it is also possible to arrange only one internal register so that it can be scanned in and scanned out.

During normal operation the content of the program counter 12 is provided as an address signal to an external storage (not shown). From the external storage is provided on a Z bus data read out in accordance with the address signal. When the data on the Z bus is an instruction word, it is set in the instruction register 15, whereas, when the data is operand data, it is set in the data register 14.

In the case where an instruction decoded by the instruction register 15 is (MEM 1)←(MEM 1)+(DR), that is, an arithmetic instruction that adds the contents of the memory 11-1 and the data register 14 and sets the added data in the memory 11-1, the contents of the memory 11-1 and the data register 14 are input into the arithmetic unit via X and Y buses, respectively. The arithmetic results of the arithmetic unit 16 are written in the memory 11-1 via the Z bus. Further, each bit of the flag register 13 is set according to the arithmetic results.

A description will be given of the case where the internal registers used in place of the internal memories during diagnosis are the flag register 13 and the data register 14.

Select signals and write enable signals for the flag register 13, the data register 14 and the memories 11-1 and 11-2 are expressed by the following expressions:

For the memories:

$$MSL = MSL' \cdot \overline{TM}$$

$$MWE = MWE' \cdot \overline{TM}$$

For the registers:

$$RSL = RSL + TM \cdot MSL'$$

$$RWE = RWE + TM \cdot MWE'$$

where MSL is a memory select signal, MSL' an original memory select signal, TM a test mode signal, MWE a memory write enable signal, MWE' an original memory write enable signal, RSL a register select signal, and RWE a register write enable signal.

During diagnosis TM="1" and request signals to the memories are all inhibited but instead request signals to the flag register 13 and the data register 14 which are used as substitutes for the memories are valid. During diagnosis a test pattern is set by a scan operation for each register. In the event that an arithmetic instruction, (MEM 1)←(MEM 1)+(MEM 2), is set in the instruction register 15 for making a diagnosis of the arithmetic unit 16, a system clock is generated in the state of TM="1" for several cycles after the scan-in operation, for executing the arithmetic instruction. At this time, since TM="1", the contents of the flag register 13 and the data register 14 are input via the X and Y buses to the arithmetic unit 16 and the arithmetic results are set in the flag register 13. After execution of the arithmetic instruction, the scan operation is performed again and the arithmetic results set in the flag register 13 are output as the scan-out data SDo to the outside, by which the arithmetic unit 16 can be diagnosed.

Figure 4:
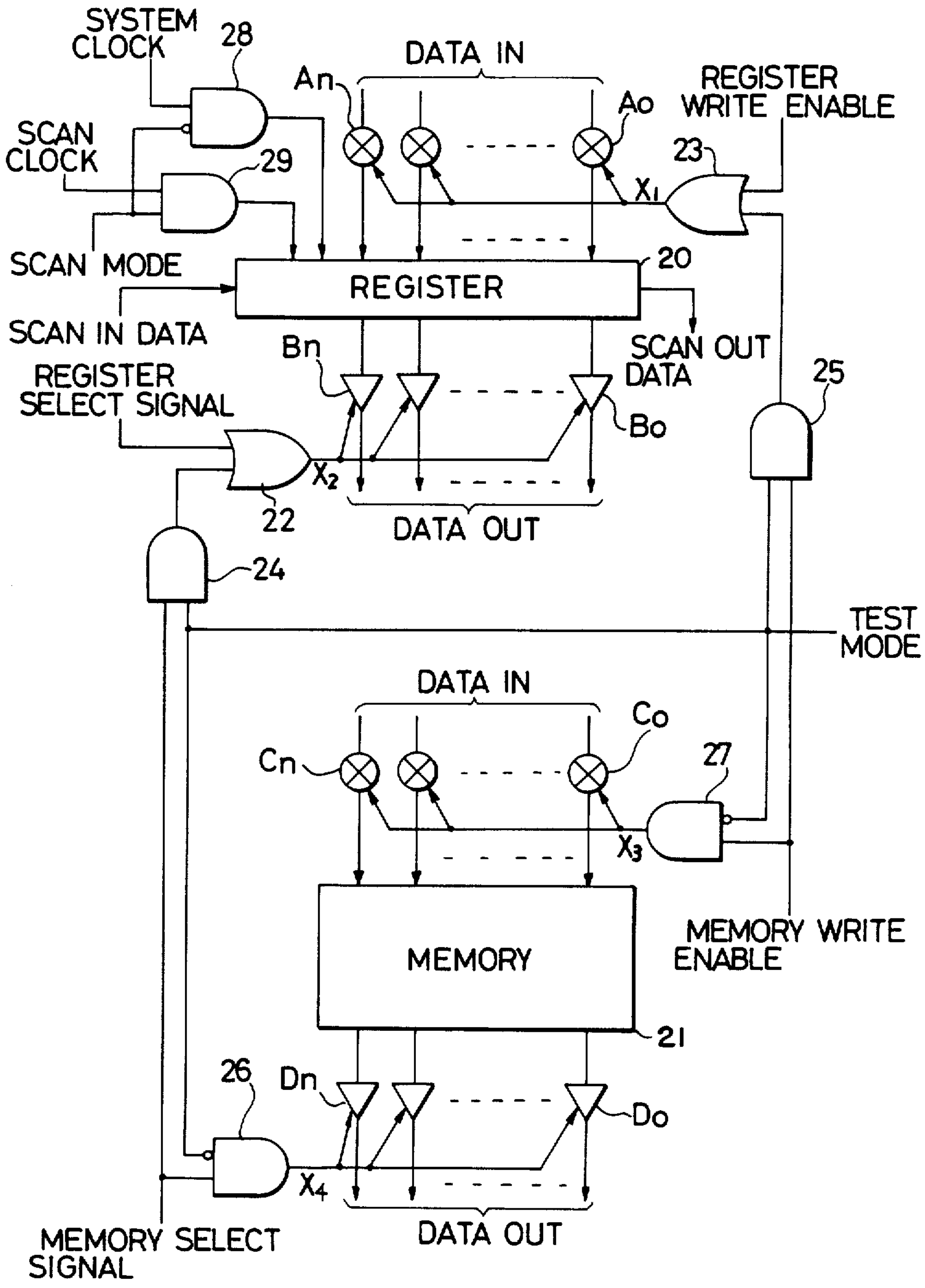
FIG. 4 is a block diagram illustrating the principal part of the embodiment of the present invention.

FIG. 4 is a block diagram illustrating the principal part of the embodiment of the present invention. Reference numeral 20 indicates a register (corresponding to the flag register 13 or data register 14 in FIG. 3); 21 designates a memory (corresponding to the memory 11-1 or 11-2 in FIG. 3); 22 and 23 identify OR circuits; 24 to 29 denote AND circuits; and $A_0$ to $A_n$, $B_0$ to $B_n$, $C_0$ to $C_n$ and $D_0$ to $D_n$ represent gate groups, respectively. As the gates $B_0$ to $B_n$ and $D_0$ to $D_n$, tristate gates are used for preventing a bus fight on the X and Y buses.

Input data from the Z bus (see FIG. 3) to the register 20 is controlled by the gates $A_0$ to $A_n$ and output data from the register 20 to the X or Y bus (see FIG. 3) is controlled by the gates $B_0$ to $B_n$ A control signal $X_1$ for the gates $A_0$ to $A_n$ is made valid when the register write enable signal or the memory write enable signal in a test mode becomes valid.

A control signal $X_2$ for the gates $B_0$ to $B_n$ is made valid when the register select signal or the memory select signal in the test mode becomes valid. Input data to the memory 21 is gated by the gates $C_0$ to $C_n$ and output data from the memory 21 is gated by the gates $D_0$ to $D_n$. A control signal $X_3$ for the gates $C_0$ to $C_n$ is made valid by the memory write enable signal except in the test mode. A control signal $X_4$ for the gates $D_0$ to $D_n$ is made valid when the memory select signal becomes valid except when in the test mode.

When the system is in its normal operative state, the test mode signal is a "0", so that only the register write enable signal and the register select signal becomes valid for the register 20. If the scan mode signal happens to be a "0", the system clock is applied to the register 20 and when the register write enable signal is applied, the input data is set in the register 20. When the scan mode signal happens to be a "1", the scan clock is provided to the register 20 and the scan-in data SDi is scanned in the register 20 and, at the same time, the scan-out data SDo is output therefrom. Also for the memory 21, the memory write enable signal and the memory select signal become valid. Consequently, the register 20 and the memory 21 are able to perform normal operation.

When the test mode signal is made a "1" to put the system in the diagnostic state, the memory write enable signal becomes the control signal $X_1$ for the gates $A_0$ to $A_n$, whereas the memory select signal becomes the control signal $X_2$ for the gates $B_0$ to $B_n$. Since the AND circuits 26 and 27 are closed, the control signals $X_3$ and $X_4$ for the gates $C_0$ to $C_n$ and $D_0$ to $D_n$ both go to "0s" and the memory 21 is separated by the gates $C_0$ to $C_n$ and $D_0$ to $D_n$. In consequence, when a memory write instruction is executed, write data is set in the register 20 and when a memory read instruction is executed, the content of the register 20 is output.

Figure 5:
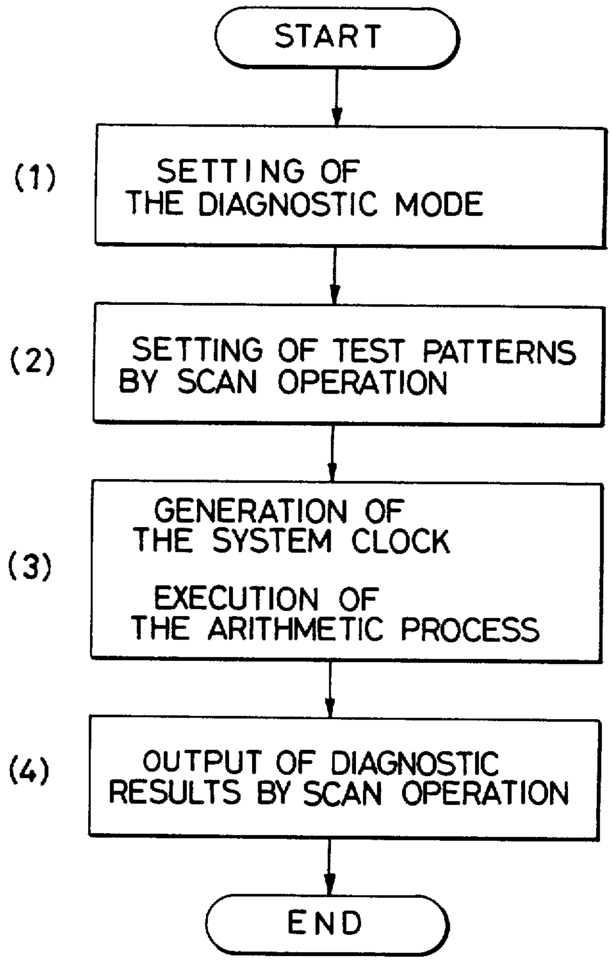
FIG. 5 is a flowchart of a diagnostic operation of the embodiment of the present invention.

FIG. 5 is a flowchart of the diagnostic operation, showing steps (1) to (4).

(1) The system is put in a diagnostic mode of operation. In this case, the test mode signal is made a "1".

(2) A test pattern is set by the scan operation. At this time, the test mode signal and the scan mode signal both go to "1s".

(3) The system clock is generated to execute arithmetic processing. At this time, the test mode signal goes to a "1"and the scan mode signal goes to a "0".

(4) The diagnostic results are output by the scan operation. At this time, the test mode signal goes to a "1" and the scan mode signal goes to a "1".

Figure 6:
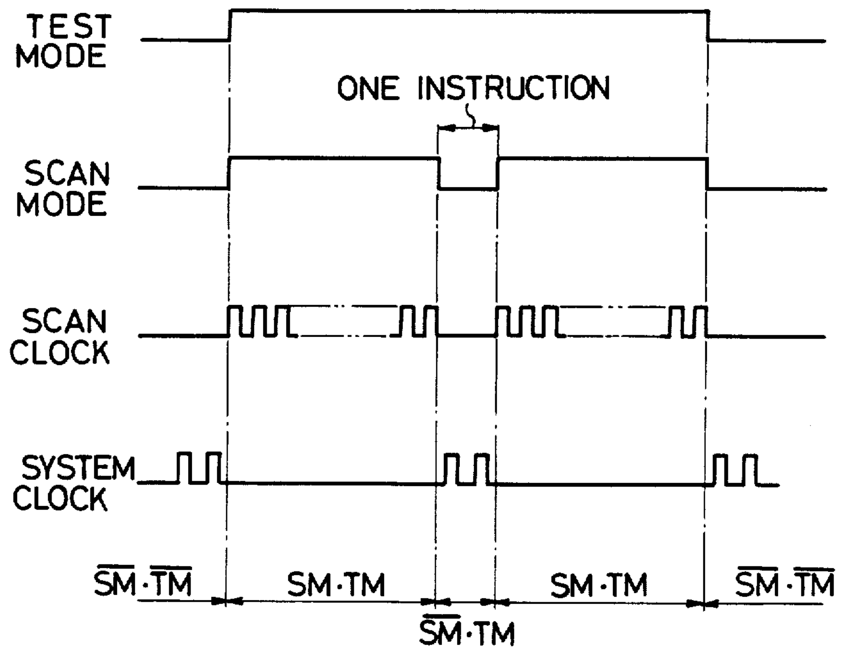
FIG. 6 is a timing chart of the diagnostic operation.

FIG. 6 is a timing chart of the diagnostic operation. A device to be diagnosed assumes the following four states according to the test mode signal TM and the scan mode signal SM.

(a) $\overline{SM} \cdot \overline{TM}$

This is a state of neither the scan operation nor the diagnostic operation. The normal operation takes place.

(b) $SM \cdot \overline{TM}$

This is a state in which the scan operation is performed under the normal operative condition. In this state, the status of a register or a flip-flop in the device can be taken out to the outside, or they can be set to a desired state.

(c) $\overline{SM} \cdot TM$

This is the diagnostic state of the device. At this time, the interior of the device is arranged for diagnosis. In the case where a tri-state bus exists in the device, a control circuit for preventing a bus fight during diagnosis and the diagnostic function for the memory in the device become valid under this condition.

(d) $SM \cdot TM$

The scan in/scan out is performed under the diagnostic condition. That is, a test pattern for diagnosis is set and the diagnostic results are taken out.

In FIG. 6, when the test mode signal TM goes to the "1" state, the system is put in the diagnostic state and when the scan mode signal SM goes tc the "1" state, the scan clock is provided to the register 20 to scan in a test pattern. Next, when the scan mode signal goes to the "0" state, the system clock is applied to the register 20 and when the memory select signal is applied, the content of the register 20 is output via the gates $B_0$ to $B_n$ into a combinational circuit, such as an arithmetic unit. When the memory write enable signal is applied, input data (the output data from the combinational circuit, such as an arithmetic unit) is set in the register 20 via the gates $A_0$ to $A_n$. The period during which the scan mode signal remains at the "0" level is the period for execution of one instruction and when the scan mode signal goes to the "1" level again, the scan clock is provided to the register 20, scanning out its content. This scan-out data SDo is taken out to the outside for diagnosing the combinational circuit, such as an arithmetic unit.

As has been described in the foregoing, according to the present invention, there is no need of providing, on the input and output sides of a memory, registers which are used for diagnosis only, and a combinational circuit, such as an arithmetic unit, which refers to an internal memory can be diagnosed through utilization of internal registers.

It will be apparent that many modifications and variations may be effected without departing from the scope of the novel concepts of the present invention.

What is claimed is:

1. A data processor logic unit diagnostic system, comprising:
- a logic unit;
- memory means, connectable via memory control means to said logic unit to establish a first data path between said logic unit and said memory means, for storing process data to be processed by said logic unit;
- register means, connectable via register control means to said logic unit to establish a second data path, distinct from said first data path, between said register means and said logic unit, for storing test data for testing said logic unit;
- said memory control means being responsive to memory means input/output control signals for connecting said first data path,
- said register control means being responsive to register means input/output control signals for connecting said second data path; and
- converting means for receiving input/output control signals for the memory means and passing said input/output control signals for the memory means as either said memory means input/output control signals or said register means input/output control signals in response to respective states of a test signal.

2. A system as recited in claim 1, wherein said memory control means comprises:
- a memory input gate connected between said logic unit and said memory means;
- a memory output gate connected between said logic unit and said memory means; wherein said register control means comprises:
- a register input gate connected between said logic unit and said register means;
- a register output gate connected between said logic unit and said register means; and wherein said converting means comprises:
- a control circuit, connected to said memory input and output gates and said register input and output gates, and connected to receive register enable and select signals, memory enable and select signals, and the test signal, responding to the test signal to block the memory enable and select signals from reaching said memory input and output gates and applying the memory enable and select signals to said register input and output gates as the register enable and select signals to allow the transfer of the test data to said logic unit from said register means and output data from said logic unit to said register means.

3. A system as recited in claim 1, wherein said register means is loaded in parallel when a test signal is not received and serially loaded when a test signal is received.

* * * * *

UNITED STATES PATENT AND TRADEMARK OFFICE
CERTIFICATE OF CORRECTION

PATENT NO. : 4,876,645

DATED : October 24, 1989

INVENTOR(S) : Katsuhiko Shioya et al.

Figure 1:
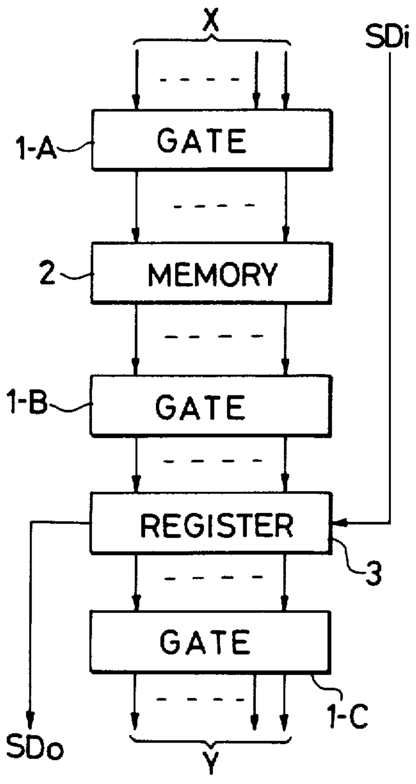
FIG. 1 PRIOR ART
FIGS. 1 and 2 are block diagrams showing the principles of conventional logic units.

It is certified that error appears in the above-identified patent and that said Letters Patent is hereby corrected as shown below:

Col. 1, line 20, after "Reference" delete --,--;
line 33, "Fig !" s/b --FIG 1--.
Col. 2, line 5, after "diagnosis" insert --.--;
line 63, after "unit" insert --16--.
Col. 3, line 7, TM s/b TM;
line 9, TM s/b TM;
line 17, seIect" s/b --select--;
line 55, after "Bo to Bn" insert --.--;
line 65, after "except" insert --when--.
Col. 4, line 66, "tc" s/b --to--.

Signed and Sealed this

Twenty-sixth Day of March, 1991

*Attest:*

HARRY F. MANBECK, JR.

*Attesting Officer*

*Commissioner of Patents and Trademarks*